United States Patent [19]

Ueda

[11] Patent Number: 4,612,259
[45] Date of Patent: Sep. 16, 1986

[54] TITANIUM CLAD STEEL PLATE

[75] Inventor: Fumihide Ueda, Shiga, Japan

[73] Assignee: Asahi Kasei Kogyo Kabushiki Kaisha, Osaka, Japan

[21] Appl. No.: 354,250

[22] Filed: Mar. 3, 1982

[30] Foreign Application Priority Data

Mar. 5, 1981 [JP] Japan ................. 56-30549
Mar. 17, 1981 [JP] Japan ................. 56-37289
May 20, 1981 [JP] Japan ................. 56-75035
Aug. 12, 1981 [JP] Japan ................. 56-125322
Sep. 7, 1981 [JP] Japan ................. 56-139845

[51] Int. Cl.$^4$ .................. B23K 20/04; B23K 20/08
[52] U.S. Cl. ................. 428/661; 228/107; 228/158; 228/190; 428/940; 428/660
[58] Field of Search ........... 228/107, 108, 109, 158, 228/175; 428/661, 940, 660

[56] References Cited

U.S. PATENT DOCUMENTS 3,137,937 6/1964 Cowan et al.
3,331,121 7/1967 De Maris et al. ............. 228/158
3,798,011 3/1974 Sharp, Jr. ................... 428/940
3,798,747 3/1974 Lalwaney.

FOREIGN PATENT DOCUMENTS 56-53888 6/1981 Japan.

OTHER PUBLICATIONS

INCRA Research Report; No. 261, pp. 6-11, 23-36 and 46-53, (Jul. 1976).

Primary Examiner—Kenneth J. Ramsey
Attorney, Agent, or Firm—Armstrong, Nikaido, Marmelstein & Kubovcik

[57] ABSTRACT

A titanium clad steel plate is formed by conversion rolling an explosively bonded composite which includes intermediate layer selected from tantalum or niobium in alloyed or unalloyed form. The process is particularly characterized by the inclusion of a second intermediate layer of cooper or nickel between the steel and the first intermediate layer. After explosion bonding of this four layered composite, the same may be preheated to for 1 hour at, e.g., 830° C. before hot rolling to a thickness of one fifth that of the composite.

8 Claims, 4 Drawing Figures

TITANIUM CLAD STEEL PLATE

The present invention relates to a titanium clad steel plate having an excellent bond strength and excellent bending ability even after hot processing during its manufacturing process or even after heat treatment after manufacturing process, and also to a method of manufacturing the same.

More particularly, the present invention relates to a titanium clad steel plate, wherein a cladding metal layer consisting of at least one layer of titanium or a titanium alloy is bonded, as one body, with a base metal layer consisting of at least one layer of carbon steel or low-alloy steel, through said cladding metal layer's and said base metal layer's bonding to an intermediate layer of a metal selected from niobium, a niobium alloy, tantalum and a tantalum alloy, and also relates to a method of manufacturing the said titanium clad steel plate which is useful as a structural material.

A titanium clad steel plate is a clad steel plate of which base metal is steel and of which cladding metal is titanium or its alloy having excellent corrosion resistance and heat resistance, and is utilized in many applications.

As manufacturing methods of titanium clad steel plate, the roll bonding process, the diffusion bonding process and others are recently being studied in addition to the conventional explosive bonding process. However, titanium clad steel plates manufactured by these new processes have problems. In the roll bonding process, brittle intermetallic compounds are formed during hot rolling and thereby a satisfactory bond strength can not be obtained. In the diffusion bonding process, the use of a base metal of which chemical component is modified or the use of an intermediate metal is proposed, however, any proposed method is not industrially adopted, except for trial manufacturing of small scale because problems similar to those of the roll bonding process still remain to be solved.

Accordingly, only titanium clad steel plate manufactured by the explosive bonding process is extensively used as materials for chemical equipments.

However, titanium clad steel plate of this explosive bonding process also has problems. For instance, titanium plate being commercially manufactured and marketed has a width of only about 2.5 m or below and the plate of a larger width is not available. Also, when the base metal is a thin plate, due to strain caused by explosive bonding or reduction in elongation of the base metal, titanium clad steel plate having an area sufficiently large to respond to market needs is not available yet.

For improving the above situation, methods are being tried which can obtain wider and/or longer titanium clad steel plate by hot-rolling the titanium clad steel plate. No such method, however, is industrially used yet.

For example, Japanese Patent Publication No. 432/1969 discloses a method for obtaining explosive bonded and hot-rolled clad steel plate of excellent bond strength by hot-rolling, at about 475° to 900° C., the titanium clad steel plate which has a brittle intermetallic compounds region and a direct titanium-to-steel bonding region.

However, the above method was found to be an incomplete one, after conducting a proving test. Namely, the rolling temperature of this method is in a lower range compared with that of normal steel plate; therefore, work hardening of the base metal is remarkably high, its elongation in tension test does not meet the specified value, and its workability in bonding is remarkably reduced. The application of a heat treatment at 540° C. or above for improving the above characteristics of the base metal results in large reduction in bond strength between titanium and steel and, in many cases, leads to a shear strength below 14 kg/mm$^2$ which is a minimum value in many titanium clad steel plate specifications. The characteristics of the base metal could not be improved by heat treatment below 540° C.

The above reduction in bond strength is caused by the fact that, in the heat treatment process, mutual diffusion occurs between the cladding titanium and the base steel and thereby hard and brittle intermetallic compounds are formed.

For improving these defects, there is proposed a method in which an intermediate metal is interposed between titanium and steel in order to prevent mutual diffusion between titanium and steel.

As manufacturing methods of this multilayered titanium clad steel plate in which an intermediate metal is interposed, there are, in addition to the above-mentioned diffusion bonding process, other processes such as the roll bonding, the physical vapor deposition and the electric plating. In view of reduction in bond strength during hot rolling, multilayered titanium clad steel plate is most preferably manufactured by the explosive bonding process.

The thickness of this intermediate metallic layer should be made to an allowable minimum level. A thick intermediate layer will possibly cause new inconveniences in the case of the clad steel plate requiring a welding operation. Also, since the intermediate metallic layer is generally made of noble metal or a rare metal or a such metal alloy, the clad steel plate in which an intermediate metal is interposed has an industrial meaning only when its intermediate metal is used in a quantity as small as possible.

The thickness of the intermediate metal layer is sufficient in several millimicrons to several tens of millimicrons, from the standpoint of safe prevention of mutual diffusion, However, achievement of the above thickness of the intermediate metallic layer is difficult in the normal explosive bonding process. When an intermediate metal of 1 mm thickness is used, rolling to one tenth to one hundredth thick becomes necessary. This necessitates that the thickness of a clad steel plate before hot rolling is 10 to 100 times thick that of the clad steel plate after hot rolling, and manufacture of such a clad steel plate can not be conducted industrially.

In order to improve such defects, the inventor had found out a very useful method as described in the previously applied Japanese Patent Application Kokai (Laid-open) No. 53888/1981.

In the method, firstly an intermediate metal such as nickel, molybdenum, platinum, gold or silver, all of which effectively prevent mutual diffusion, is explosive bonded to steel then this clad steel formed is rolled by hot rolling or the like to a minimum thickness allowed to the intermediate metal, and subsequently this explosive bonded and rolled clad steel plate is interposed between a cladding material and a base steel plate, and they (three layers) are explosive bonded according to the known explosive bonding process and further rolled, and thus a clad steel plate having a thin intermediate metal layer is obtained.

Experiments conducted after filing of the above patent application revealed that, when the method of the above patent application is applied to titanium clad steel, exceptionally, its bond strength after hot rolling is still low and the bond strength is further reduced by subsequent heat treatment.

That is to say, it became clear that the above intermediate metal such as nickel, molybdenum, platinum, gold or silver has excellent bond strength to base steel even after hot rolling but has insufficient bond strength to cladding titanium after hot rolling.

In proving tests, explosive bonded and hot rolled clad steel plate (Ti/Ni/steel/steel) had a bond strength of less than 10 kg/mm$^2$ as shear strength after rolling and did not meet 14 kg/mm$^2$ mostly specified for titanium clad steel plates. Meanwhile, the titanium clad steel of the present invention showed a shear strength of over 25 kg/mm$^2$ even after hot rolling during manufacturing process or even after heat treatment at above 540° C. after manufacturing process, and the titanium clad steel plate of the present invention was confirmed to possess an excellent bond strength.

The present inventor conducted various investigations and experiments to improve these defects of titanium clad steel plate, and as its result, the present invention has been achieved.

This invention relates to titanium clad steel plate of at least three layers which contains, between titanium and steel, at least one layer of an intermediate metal containing any one of tantalum, a tantalum alloy, niobium and a niobium alloy.

The titanium material used in this invention is commercially pure titanium (at least about 99.4% titanium by weight) or titanium alloy plate containing at least 73.05% by weight of titanium such as Ti-5Pd or the like, and is often referred to as titanium plate in this invention. The steel material used in this invention is SS material, SB material, SM material and SUS material all specified in Japanese Industrial Standards (JIS), and carbon steel or low-alloy steel similar to the above materials, and the like.

Hereinafter, the titanium clad steel of the present invention is explained in detail referring to the accompanying drawings.

FIG. 1(a)-1(f) is a schematic showing of the several stages of explosion bonding and rolling for both three layered and four-layered composites;

FIGS. 3(a)-3(f) is a schematic showing of an embodiment of the invention utilizing a two layered composite as the intermediate plate of a conversion rolling process; and, FIG. 4 is a microscopic photograph of a cross section of titanium clad steel plate made according to the invention.

Figure 1:
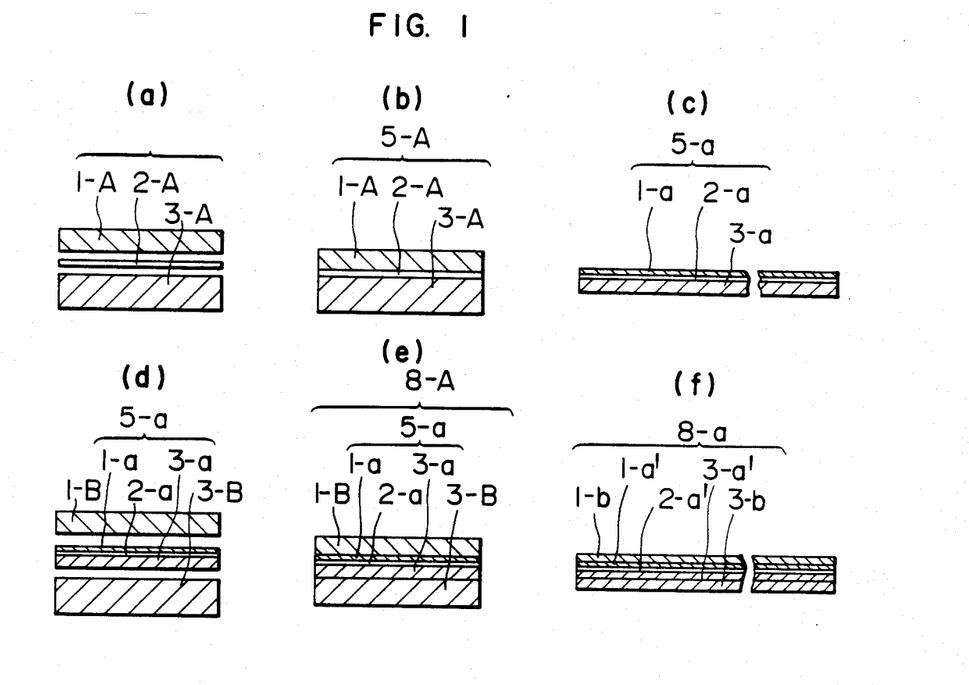
Figure 2:
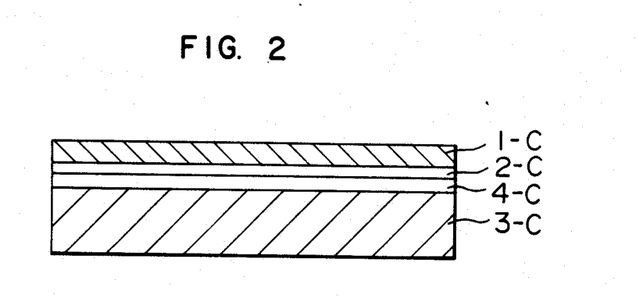
FIG. 2 shows a sectional view of a four layered product made according to the invention.
Figure 3:
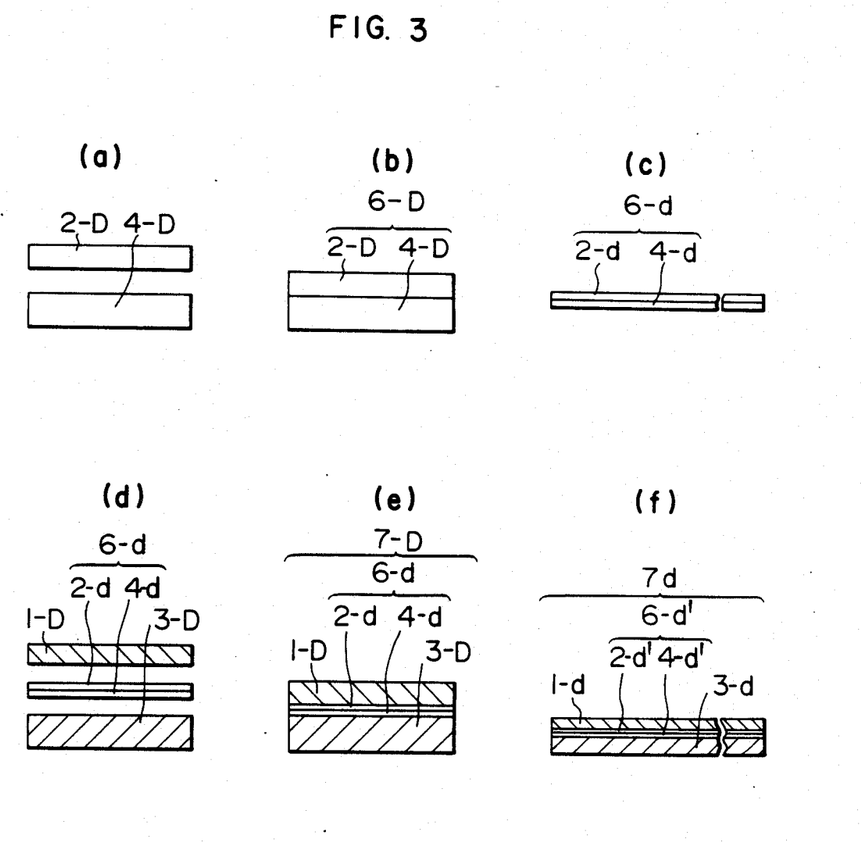

FIGS. 1 to 3 are the drawings illustrating embodiments of the present invention. In the drawings, numbers indicate the following materials, and capital alphabets indicate raw materials and small alphabets indicate materials after processing.

1: Titanium plate
2: Intermediate metal
3: Steel plate
4: Supplemental intermediate layer
5: Three-layered clad plate
6: Two-layered clad plate
7: Four-layered clad plate
8: Five-layered clad plate.

FIG. 1, (a) to (f) are drawings corresponding to a manufacturing method of claim 13 of the present invention. In FIG. 1, (a), 1-A is titanium plate, 2-A an intermediate metal and 3-A steel plate. The intermediate metal 2-A must be a metal which has excellent malleability and ductility and does not form brittle intermetallic compounds at each interface. Researches revealed that the most suitable intermediate metals are commercially pure niobium, niobium alloys such as Nb-Zr and Nb-Ti, commercially pure tantalum, and tantalum alloys such as Ta-Nb and Ta-Ti.

The titanium plate 1-A, the intermediate metal 2-A and the steel plate 3-A are bonded by the known method into a three-layered clad steel plate shown in FIG. 1, (b).

This bonding is conducted preferably by the known explosive bonding process shown in many literatures such as U.S. Pat. No. 3,137,937, but can also be made by other methods such as the known diffusion bonding process and the known roll bonding process as disclosed in INCRA Research Report of July 1976.

The explosive bonding process has two methods. The one is a method in which firstly the steel plate 3-A and the intermediate metal 2-A are explosive bonded and then the titanium plate 1-A is explosive bonded on the surface of the intermediate metal 2-A. The other is a method in which three layers are explosive bonded simultaneously. In the former method, surface roughening ocurrs on the surface of the intermediate metal 2-A in the first explosive bonding. Also, niobium or tantalum is susceptible to oxidation at its surface because of its activation, and, for the removal of the surface oxide film, surface polishing becomes necessary, which causes the loss of the valuable material. On the other hand, in the latter method, the interposing of the intermediate metal 2-A between the titanium plate 1-A and the steel plate 3-A and the explosive bonding of these three layers are carried out simultaneously. Accordingly, the intermediate metal, even if it is an active metal, is not contacted with air, therefore is not oxidized and there is no need of polishing. Moreover, there is no surface roughening and no material loss.

This three-layered clad steel plate is hot rolled into a thin three-layered clad steel plate 5-a consisting of three layers 1-a, 2-a and 3-a shown in FIG. 1, (c).

The amount of thickness reduction by this hot rolling (difference of plate thicknesses before and after rolling, amount of plate thickness decreased due to rolling) varies depending upon rolling conditions such as rolling temperature and rolling mill capacity.

In existing facilities, the maximum amount of reduction will be the one in which plate thickness is reduced to about one hundredth. The minimum amount of reduction can be 0 mm of the diffusion bonding process. In the present invention, the amount of reduction is not particularly specified.

The thin, three-layered titanium clad steel plate thus obtained was confirmed to have an excellent bond strength and excellent bending ability.

Further, this thin, three-layered titanium clad steel plate 5-a is interposed, as an intermediate metal, between cladding titanium 1-B and base steel plate 3-B, as shown in FIG. 1, (d), and these three layers are bonded by the use of a known bonding process such as the explosive bonding process, the diffusion bonding process or the roll bonding process. Namely, the titanium plate 1-a of the thin, three-layered titanium clad steel plate 5-a is bonded with the cladding titanium 1-B, and the steel plate 3-a of the clad steel plate 5-a is bonded with the base steel 3-B.

The above bonding is also done either in the two step method (the thin, three-layered clad steel plate 5-a is bonded to the base steel 3-B and then the cladding titanium 1-B is bonded thereon) or in the one step method (simultaneous bonding of three layers). The latter method is more effective. FIG. 1, (e) illustrates the bonded clad steel plate 8-A.

This clad steel plate 8-A is rolled into a clad steel plate 8-a having a desired thickness. At this time, the amount of reduction is not specified.

As also described in the aforementioned Japanese Patent Publication No. 432/1968, when heated to a temperature of 880° C. or above, the crystal system of titanium is transformed from close packed hexagonal lattice to body-centered cubic lattice and the crystal grains grow. Moreover, titanium absorbs gases such as nitrogen, hydrogen and oxygen, and thereby the physical properties of titanium deteriorate. Accordingly, in this invention, hot rolling is desired to be carried out below 880° C., preferably in the temperature range of 650° to 870° C.

It was confirmed that application of a heat treatment to the clad steel plate after rolling, if necessary, for improving the physical properties of the base metal did not cause large reduction in bonding strength and the clad steel plate had an excellent interface bond strength even after the heat treatment.

This heat treatment temperature is in the range of 540° to 870° C. When the treatment is done below 540° C., it does not contribute to the improvement of the characteristics of the base metal. When the treatment is conducted above 870° C., the physical properties of titanium deteriorate as described above.

In the hot rolling of this invention, heating and rolling can be repeated several times. Also, process annealing can be applied to prevent the deterioration of the mechanical properties of the base steel.

Also, the clad steel plate 8-a can be produced by bonding the cladding metal 1-B, the thin, three-layered clad steel plate 5-a and the base steel 3-B to one another with rolling and finishing these three plates into a composite plate of a desired thickness. The clad steel plate 8-a may be also produced by firstly bonding the thin, three-layered clad steel plate 5-a and the base steel 3-B by the roll bonding process and then the cladding titanium 1-B is bonded thereon by another bonding process.

In order to give a desired thickness to the intermediate metal [2-A in FIG. 1, (b), 2-a in FIG. 1, (c), (d) and (e) and 2-a' in FIG. 1, (f)] of the final product, the thickness of the original intermediate metal 2-A must be carefully decided by fully considering (1) the thicknesses of the titanium plate 1-A and the steel plate 3-A in FIG. 1 (a), (2) the amount of reduction in rolling into the thin, three-layered clad steel plate 5-a of FIG. 1, (c), and (3) the amount of reduction in rolling from FIG. 1, (e) to FIG. 1, (f).

The test conducted for the plate 8-a of FIG. 1, (f) in its "as rolled" condition revealed that the titanium clad steel plate fully satisfied min. 14 kg/mm² which is the specified value of shear strength of the titanium clad steel plate specified by JIS G 3603-1980. This titanium clad steel plate was subjected to heat treatment of 850° C.×1 hr. and then tested for shear strength. A shear strength which well satisfied the above JIS specification value was obtained. From the results of tension test and bending test, the above titanium clad steel plate was proved to have an excellent bond strength and excellent ductility.

It was also confirmed that the present invention could provide thin or wide titanium clad steel plate which cannot be provided by the conventional manufacturing process of explosive bonded titanium clad steel plate. Also, since the welding of clad steel plate is generally difficult, the fact that wide titanium clad steel plate having an excellent bond strength can be provided by the present invention method, is a significant matter.

FIG. 2 shows another type of titanium clad steel plate manufactured by the present invention, in which an intermediate metal layer and a supplemental intermediate layer are comprised. In the figure, 2-C is an intermediate metal corresponding to claim 5 of this invention and is selected from tantalum, tantalum alloys, niobium and niobium alloys. In the figure, 4-C is a supplemental intermediate layer selected from commercially pure copper, copper alloys, commercially pure nickel and nickel alloys, and is used to make the intermediate metal as thin as possible in the final product. This supplemental intermediate layer must be a material which does not allow the formation of hard and brittle intermetallic compounds between the intermediate metal and the base metal.

In the above, the commercially pure copper is a copper plate of which copper content is 99% by weight or above, and copper alloys are the copper alloys containing at least 58% copper by weight. Also, the commercially pure nickel is a nickel plate of which nickel content is at least 99.0% by weight, and nickel alloys are the nickel alloy plates containing at least 40.0% nickel by weight.

This four-layered clad steel plate can be produced by bonding one layer successively on the base steel according to the conventional bonding process. The four-layered titanium clad steel plate can also be produced by (1) previously bonding the intermediate metal 2-C and the supplemental intermediate layer 4-C and then cold rolling or hot rolling the bonded intermediate layer into a thin plate, (2) bonding the thin plate to the base steel, and (3) finally bonding the cladding plate to the surface of the plate formed in (2). Further, by hot rolling this four-layered titanium clad steel, there can be produced thin or wide titanium clad steel plate which the conventional explosive bonding process could not provide. This four-layered titanium clad steel plate also can be subjected to heat treatment, after rolling, for improving the characteristics of the base metal. This four-layered titanium clad steel plate has an excellent bond strength and sufficient ductility, in as-rolled condition and after heat treatment.

Since the welding of clad steel plate is generally difficult, the fact that large-sized titanium clad steel plate having an excellent bond strength can be provided by the present invention method, is significant.

FIG. 3 shows a manufacturing process of four-layered titanium clad steel corresponding to claim 7 of the present invention.

In FIG. 3, (a), 2-D is an intermediate metal, and 4-D is a supplemental intermediate layer. These two intermediate metal plates are bonded together by a conventional bonding process such as the explosive bonding process or the diffusion bonding process, into a clad plate 6-D as shown in FIG. 3, (b).

By rolling this clad plate, a thin clad plate 6-d shown in FIG. 3, (c) is obtained. In the FIG. 2-d is the intermediate metal after rolling and 4-d is the supplemental intermediate layer after rolling. The rolling can be either of hot rolling or cold rolling, depending upon the material combination of the intermediate metal and the supplemental intermediate layer. After this rolling, the thin clad plate may be subjected to appropriate heat treatment for reducing the work hardening caused by the rolling.

The thin clad plate 6-d thus obtained is arranged between the cladding metal 1-D and the base metal 3-D as shown in FIG. 3, (d) so that the intermediate metal 2-d of the plate 6-d faces the cladding metal 1-D and the supplemental intermediate layer 4-d of the plate 6-d faces the base metal 3-D, and these three plates are bonded as shown in FIG. 3, (e). In the FIG. 7-D is the bonded clad steel plate. This bonding is carried out by a known bonding process of different metals, such as the explosive bonding process, the diffusion bonding process or the roll bonding process.

In the explosive bonding process, the base metal 3-D and the thin clad plate 6-d are firstly bonded and then the cladding metal, 1-D is bonded on the surface of intermediate metal 2-d. Alternatively, the three plates 1-D, 6-d and 3-D are explosive bonded simultaneously. The latter bonding is more efficient.

The diffusion bonding process can be performed either simultaneously or successively.

When the clad steel 7-D is converted to the clad steel plate 7-d of a desired thickness as shown in FIG. 3, (f), the thickness of the clad steel 7-D is reduced to the thickness range from two thirds to one fiftieth by rolling, depending upon the rolling temperature and the reduction capacity of the rolling mill. In FIG. 3, (f), 6-d' is the thin clad plate after rolling, 1-d is the cladding metal after rolling and 3-d is the base metal after rolling. The hot rolling can be conducted by repetition of heating and rolling several times. Further, a process annealing is also effective.

Figure 4:
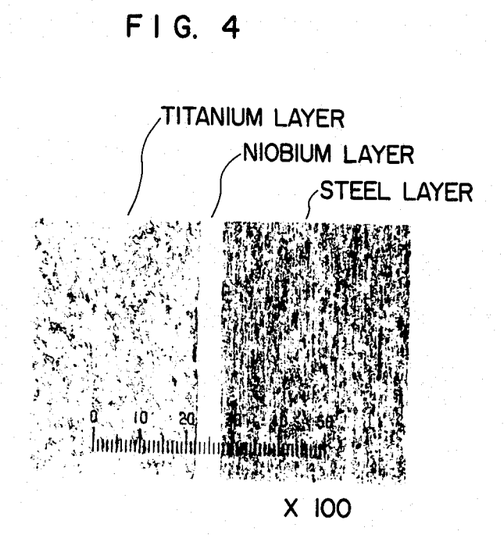

When the roll bonding process is used, at the time of rolling the clad steel 7-D, three plates, namely, the cladding metal 1-D, the thin clad plate 6-d and the base metal 3-D can be bonded simultaneously by rolling to finish into a plate of a desired thickness. Alternatively, the thin clad plate 6-d prepared beforehand is bonded to the base metal 3-D by the roll bonding process, and then the cladding metal 1-D is bonded thereon. FIG. 4 shows a microstructure of the titanium clad plate with niobium intermediate layer obtained according to this invention.

As described above, there has been established, by the present invention, a method of manufacturing titanium clad steel plate having an excellent bond strength and excellent bending ability even after hot processing during its manufacturing process or even after heat treatment after the manufacturing process.

Examples of the present invention are explained hereinafter.

EXAMPLE 1

(a) Commercially pure tantalum plate having 2 mm thickness, 100 mm width and 200 mm length was explosive bonded, as an intermediate metal, to a commercially available JIS G 3103 SB42 steel plate having 50 mm thickness, 100 mm width and 200 mm length. A commercially pure titanium plate having 5 mm thickness, 100 mm width and 200 mm length was explosive bonded on the surface of the intermediate metal. Thus, titanium clad steel was formed.

Anticipating possible welding heat or excessive heat treatment, this titanium clad steel plate of this invention was subjected to heat treatment of 850° C.×1 hr. and air cooled. The titanium clad steel plate thus obtained was tested for shear of its interface. The result was shown in Table 1.

The result revealed that the titanium clad steel of this invention had an excellent bond strength.

(b) Three-layered titanium clad steel plate having the same combination and dimensions as shown in (a) was prepared by the explosive bonding process. This clad steel plate was heated for 1 hr. at 850° C. and immediately rolled into titanium clad steel plate of 11.4 mm thickness, 100 mm width and 1,000 mm length.

The result of shear test conducted for the interface of this titanium clad steel plate was shown in Table 1.

The result revealed that the titanium clad steel plate of this invention had an excellent bond strength. Further, bending test was subjected to this titanium clad steel plate and the result indicated that the titanium clad steel plate had an excellent bending ability.

(c) Titanium clad steel plate of 11.4 mm thickness, 100 mm width and 200 mm length, prepared in the same manner as in (b) was explosive bonded to commercially available JIS G 3103 SB42 steel plate having 50 mm thickness, 100 mm width and 200 mm length. Then, on its titanium surface was explosive bonded commercially pure titanium plate having 5 mm thickness, 100 mm width and 200 mm length.

This titanium clad steel plate was heated for 1 hr. at 850° C. and immediately rolled into titanium clad steel plate having 13.3 mm thickness, 100 mm width and 1,000 mm length.

The shear strength of the interface of this titanium clad steel plate was tested and the result was as shown in Table 1. It was revealed that the titanium clad steel plate of this invention had an excellent bond strength.

(d) The titanium clad steel plate prepared in (c) was heated for 1 hr. at 850° C. and then air cooled. The shear strength of the interface of this titanium clad steel plate was tested and the result was as shown in Table 1.

The result revealed that the titanium clad steel of this invention had an excellent bond strength.

EXAMPLE 2

Titanium clad steel plate were prepared in the same manners as in Example 1, except that commercially pure niobium plate was used in place of commercially pure tantalum plate used in Example 1. The shear strength of the interface of each titanium clad steel plate was tested and their results were as shown in Table 1.

These results showed that the titanium clad steel plates of the present invention had excellent bond strengths.

EXAMPLE 3

The titanium clad steel plate of Example 1, (b) was prepared and cut into a size of 11.4 mm thickness, 100 mm width and 200 mm length. On the base steel side of this titanium clad steel plate was placed commercially available JIS G 3103 SB42 steel plate having 50 mm thickness, 100 mm width and 200 mm length, and on the titanium side was placed commercially pure titanium having 5 mm thickness, 100 mm width and 200 mm length. This assembly was diffusion bonded under vacuum ($10^{-4}$ Torr) at an elevated temperature of 700° to 1,100° C. for at least 10 min. and at a pressure of at least 0.1 kg/mm² for at least 10 min. This clad plate was heated for 1 hr. at 850° C. and immediately rolled into a titanium clad steel plate having 13.3 mm thickness, 100 mm width and 1,000 mm length.

The shear strength of the interface of this titanium clad steel plate was tested and its result was as shown in Table 1.

The result revealed that the titanium clad steel of this invention had an excellent bond strength.

EXAMPLE 4

A commercially available cupro-nickel plate (JIS H 3100 C7060P) having 2 mm thickness, 100 mm width and 200 mm length was explosive bonded to commercially available JIS G 3103 SB42 steel plate having 50 mm thickness, 100 mm width and 200 mm length. On the cupro-nickel plate side was explosive bonded commercially pure tantalum plate having 2 mm thickness, 100 mm width and 200 mm length. Further, on the surface of tantalum was explosive bonded commercially pure titanium plate having 6 mm thickness, 100 mm width and 200 mm length, and thus titanium clad steel plate was prepared. This titanium clad steel plate was heated for 1 hr. at 850° C. and immediately rolled into titanium clad steel plate having 20 mm thickness, 100 mm width and 600 mm length. This titanium clad steel was again heated for 1 hr. at 850° C. and immediately rolled into titanium clad steel plate having 10 mm thickness, 100 mm width and 1,200 mm length.

The shear strength of the interface of this titanium clad steel plate was tested and its result was shown in Table 1.

The results indicated that the titanium clad steel plate of this invention had an excellent bond strength.

EXAMPLE 5

Titanium clad steel having the same combination and same dimension as those of Example 4 was prepared and heated for 1 hr. at 870° C. and immediately rolled into titanium clad steel plate having 20 mm thickness, 100 mm width and 600 mm length. The finishing temperature in rolling was 750° C.

The bond strength of this titanium clad steel plate was tested and its result was as shown in Table 1.

The result indicated that the titanium clad steel plate of this invention had an excellent bond strength.

EXAMPLE 6

Using oxygen-free copper plate (JIS H 3100 C1020P) having 2 mm thickness in place of the cupro-nickel plate which is the supplemental intermediate metal in Example 4, there was prepared four-layered titanium clad steel plate having the same dimension as that of Example 4. This clad steel plate was heated for 1 hr. at 800° C. and immediately rolled into a titanium clad steel plate having 20 mm thickness, 100 mm width and 600 mm length. The finishing temperature in rolling was 520° C.

This titanium clad steel plate was subjected to heat treatment of 1 hr. × 850° C. and then tested for its bond strength. The result was as shown in Table 1.

The result revealed that the titanium clad steel plate of this invention had an excellent bond strength.

EXAMPLE 7

Commercially pure niobium plate and oxygen-free copper plate (JIS H 3100 C1020P) both being commercially available were explosive bonded, and clad plate of (2+12) mm thickness, 100 mm width and 200 mm length was prepared. This clad plate was cold rolled into thin clad plate of (0.5+3.0) mm thickness, 200 mm width and 400 mm length. The copper side of this clad plate was explosive bonded on commercially available JIS G 3103 SB42 steel plate of 50 mm thickness, 200 mm width and 400 mm length, and further on the niobium side of this clad plate was explosive bonded commercially available titanium plate of 5 mm thickness, 200 mm width and 400 mm length. Thus, four-layered titanium clad steel plate having (5+0.5+3.0+50) mm thickness, 200 mm width and 400 mm length was obtained.

This titanium clad steel plate was heated for 1 hr. at 830° C. and hot-rolled into one fifth thick to obtained titanium clad steel plate having (1+0.1+0.6+10)mm thickness, 400 mm width and 1,000 mm length.

The titanium clad steel plate thus prepared was tested for its bond strength. The result indicated that the clad steel plate had a shear strength of over 14 kg/mm² which is the JIS specification value, even in as-rolled condition and also after heat treatment of 625° C.×1 hr. followed by furnace cooling after rolling.

EXAMPLE 8

Commercially pure niobium plate and commercially pure nickel plate both being commercially available were explosive bonded to obtain clad plate of (2+12) mm thickness, 100 mm width and 200 mm length. This clad plate was cut into two pieces each having (2+12) mm thickness, 100 mm width and 100 mm length. Niobium sides of both pieces were joined and they were made into one plate by peripherally welding. At that time, a release agent was coated between two adjacent niobium plates, and the air present between respective interfaces was replaced by an inert gas. The plate was then heated for 1 hr. at 900° C. and subsequently rolled into a thickness of one fourth. By separating the plate obtained, two thin clad plates each having (0.5+3.0) mm thickness, 100 mm width and 400 mm length were prepared. The nickel side of this thin clad plate was explosive bonded on commercially available JIS G 3103 SB42 steel plate of 50 mm thickness, 100 mm width and 400 mm length, and further on the niobium side was explosive bonded commercially available titanium plate of 5 mm thickness, 100 mm width and 400 mm length. Thus, four-layered titanium clad steel plate having (5+0.5+3.0+50) mm thickness, 100 mm width and 400 mm length was obtained.

This titanium clad steel was heated for 1 hr. at 830° C. and then rolled to a thickness of one fifth to obtain titanium clad steel plate of (1+0.1+0.6+10) mm thickness, 400 mm width and 500 mm length.

The titanium clad steel plate thus obtained was tested for its bond strength. The result indicated that the clad steel plate had an excellent bond strength of over 14 kg/mm² which was the JIS specification value, even in as-rolled condition and also even after heat treatment of 625° C.×1 hr. followed by furnace cooling after rolling.

EXAMPLE 9

Commercially pure tantalum plate of 2 mm thickness, 100 mm width and 100 mm length and oxygen-free copper plate (JIS H 3100 C1020P) of 10 mm thickness, 100 mm width and 100 mm length both being commercially available were diffusion bonded under vacuum ($10^{-4}$ Torr) at 700° to 1,100° C. and at a pressure of above 0.1 kg/mm$^2$ for at least 10 min. This clad plate was cold rolled into a thickness of one fourth to obtain thin clad plate of (0.5+2.5) mm thickness, 100 mm width and 400 mm length. The copper side of this thin clad plate was explosive bonded on commercially available JIS G 3106 SM41R steel plate of 50 mm thickness, 100 mm width and 400 mm length, and further on the tantalum side was diffusion bonded commercially available titanium plate of 5 mm thickness, 100 mm width and 400 mm length under the same conditions as above. Thus, four-layered titanium clad steel plate of (5+0.5+2.5+50) mm thickness, 100 mm width and 400 mm length was obtained.

This titanium clad steel plate was heated for 1 hr. at 830° C. and rolled into a thickness of one fifth to obtain titanium clad steel plate of (1+0.1+0.5+10) mm thickness, 400 mm width and 500 mm length.

The bond strength of this titanium clad steel plate was measured. The result revealed that this clad had an excellent bond strength of over 14 kg/mm$^2$ which was the JIS specification value, even in as-rolled condition and also even after heat treatment of 625° C.×1 hr. followed by furnace cooling after rolling.

EXAMPLE 10

By explosive bonding a commercially pure tantalum plate of 2 mm thickness, 100 mm width and 100 mm length and nickel plate of 10 mm thickness, 100 mm width and 100 mm length both being commercially available, two clad plates each of (2+10) mm thickness, 100 mm width and 100 mm length were prepared. Tantalum sides of these two clad plates were joined and they were peripherally welded to be converted into one body. At that time, a release agent was coated between two adjacent tantalum plates, and the air present between respective interfaces was replaced by an inert gas. The assembly was heated for 1 hr. at 900° C. and then rolled into a thickness of one fourth to obtain a composite plate consisting of two thin clad plates each having (0.5+2.5) mm thickness, 100 mm width and 400 mm length. Further, on both sides (nickel surfaces) of this composite plate were placed two commercially available JIS G 3103 SB42 steel plates each having 50 mm thickness, 100 mm width and 400 mm length, and after peripherally welding, this assembly was heated for 1 hr. at 900° C. and then rolled into a thickness of one half to carry out roll bonding between nickel and the steel plate. By removing the peripherally welding, two clad plates each having (0.25+1.75+25) mm thickness, 200 mm width and 400 mm length were obtained.

On the tantalum side of this clad plate was explosive bonded commercially available titanium plate of 2.5 mm thickness, 200 mm width and 400 mm length, and titanium clad steel plate of (2.5+0.25+1.75+25) mm thickness, 200 mm width and 400 mm length was obtained.

This titanium clad steel plate was heated for 1 hr. at 830° C. and then rolled into a thickness of two fifths to obtain titanium clad steel plate of (1+0.1+0.7+10) mm thickness, 400 mm width and 500 mm length.

The bond strength of this titanium clad steel plate was measured. The result showed that this plate had a shear strength of over 14 kg/mm$^2$ which was the JIS specification value even in as-rolled condition and also even after heat treatment of 625° C.×1 hr. followed by furnace cooling after rolling.

EXAMPLE 11

Between commercially available titanium plate of 5 mm thickness, 100 mm width and 100 mm length and commercially available JIS G 3103 SB42 steel plate of 50 mm thickness, 100 mm width and 100 mm length, there was interposed commercially pure niobium plate of commercial availability having 1 mm thickness, 100 mm width and 100 mm length. This assembly was diffusion bonded under vacuum ($10^{-4}$ Torr) at 850° C. and at a pressure of 0.5 kg/mm$^2$ for 30 min. to obtain titanium clad steel plate.

This titanium clad steel plate was again heated for 1 hr. at 830° C. and immediately rolled into a thickness of one fifth to obtain titanium clad steel plate of (1+0.2+10) mm thickness, 100 mm width and 500 mm length.

The bond strength of this titanium clad steel plate was measured. The result indicated that the plate had an excellent bond strength of over 14 kg/mm$^2$ which was the JIS specification value.

EXAMPLE 12

Two sets of each material used in Example 11 were prepared. They were arranged in the order of steel plate, niobium plate, titanium plate, titanium plate, niobium plate and steel plate. The assembly was fixed by periphery welding with a steel belt. At that time, a release agent was coated between two adjacent titanium plates, and the air present between respective interfaces was replaced by an inert gas.

This material was heated for 1 hr. at 830° C. and immediately rolled into a thickness of one fifth, and two titanium clad steel plates each having (1+0.2+10) mm thickness, 100 mm width and 500 mm length were prepared.

The bond strength of this titanium clad steel plate was measured. The result showed that the clad steel plate had an excellent bond strength of over 14 kg/mm$^2$ which was the JIS specification value.

TABLE 1

| Test Results of Bond Strength | | | |
|---|---|---|---|
| | Material combination | (Heat treatment) | Shear strength (kg/mm$^2$) |
| Example 1 | | | |
| (a) | Ti/Ta/SB42 | 850° C. × 1 hr., furnace cooling | 30.7, 31.2, 33.2 |
| (b) | Ti/Ta/SB42 | (as rolled) | 27.5, 33.0, 31.7 |
| (c) | Ti/Ta/SB42 | (as rolled) | 28.0, 29.3, 30.5 |
| (d) | Ti/Ta/SB42 | 850° C. × 1 hr., furnace cooling | 28.3, 29.3, 30.1 |
| Example 2 | | | |
| (a) | Ti/Nb/SB42 | 850° C. × 1 hr., Furnace cooling | 30.5, 27.9, 29.6 |
| (b) | Ti/Nb/SB42 | (as rolled) | 27.8, 27.2, 33.7 |
| (c) | Ti/Nb/SB42 | (as rolled) | 26.7, 26.2, 27.8 |
| (d) | Ti/Nb/SB42 | 850° C. × 1 hr., furnace cooling | 25.3, 25.7, 24.8 |
| Example 3 | Ti/Ta/SB42 | (as rolled) | 27.8, 29.6, 26.7 |
| Example 4 | Ti/Ta/C7060/SB42 | (as rolled) | 25.4, 26.9, 25.8 |
| Example 5 | Ti/Ta/C7060/SB42 | (as rolled) | 27.8, 27.6, 26.1 |

TABLE 1-continued

Test Results of Bond Strength

| | Material combination | (Heat treatment) | Shear strength (kg/mm²) |
|---|---|---|---|
| Example 6 | Ti/Ta/C1020/SB42 | 850° C. × 1 hr., furnace cooling | 29.7, 31.2, 30.5 |
| Example 7 | Ti/Nb/C1020/SB42 | (as rolled) | 31.5, 30.7, 32.5 |
| Example 7 | Ti/Nb/C1020/SB42 | 625° C. × 1 hr., furnace cooling | 30.5, 30.9, 31.4 |
| Example 8 | Ti/Nb/Ni/SB42 | (as rolled) | 30.3, 31.3, 30.6 |
| Example 8 | Ti/Nb/Ni/SB42 | 625° C. × 1 hr., furnace cooling | 30.0, 29.7, 29.9 |
| Example 9 | Ti/Ta/C1020/SB42 | (as rolled) | 29.4, 29.8, 28.9 |
| Example 9 | Ti/Ta/C1020/SB42 | 625° C. × 1 hr., furnace cooling | 29.5, 29.7, 28.6 |
| Example 10 | Ti/Ta/Ni/SB42 | (as rolled) | 30.5, 30.1, 31.3 |
| Example 10 | Ti/Ta/Ni/SB42 | 625° C. × 1 hr., furnace cooling | 30.8, 30.2, 31.1 |
| Example 11 | Ti/Nb/SB42 | (as rolled) | 29.7, 29.1, 30.3 |
| Example 12 | Ti/Nb/SB42 | (as rolled) | 27.8, 28.1, 28.4 |

EXAMPLE 13

Commercially available JIS G 3103 SB42 steel plate of 50 mm thickness, 500 mm width and 500 mm length, commercially pure niobium plate of 1.5 mm thickness, 500 mm width and 500 mm length, and commercially available titanium plate of 5 mm thickness, 500 mm width and 500 mm length were explosive bonded simultaneously to obtain three-layered titanium clad steel plate of (5+1.5+50) mm thickness, 500 mm width and 500 mm length.

This three-layered clad steel plate was heated at 850° C. for 1 hr. and immediately rolled into three-layered titanium clad steel plate of 11.3 mm thickness, 500 mm width and 2,500 mm length.

From this three-layered titanium clad steel plate was cut the clad of 11.3 mm thickness, 500 mm width and 1,000 mm length. The base steel side of this clad plate was explosive bonded to commercially available JIS G 3103 SB42 steel plate of 150 mm thickness, 500 mm width and 1,000 mm length to obtain four-layered clad plate.

Further, on the titanium surface of this four-layered clad plate was explosive bonded commercially pure titanium plate of commercial availability having 10 mm thickness, 500 mm width and 1,000 mm length.

This five-layered clad steel was heated at 850° C. for 1 hr. and immediately rolled to obtain titanium clad steel plate of 34.2 mm of total thickness, 1,000 mm width and 2,500 mm length.

Mechanical test results of the above titanium clad steel plate in as-rolled condition and after heat treatment of 850° C.×1 hr. followed by air cooling were as shown in Table 2. Test items were in accordance with JIS G 3603 for titanium clad steel.

The test results showed that this clad steel was excellent in bond strength, ductility and bending ability, and well satisfied the specification values.

Microscopic observation for the cross section of the above titanium clad steel plate revealed that the intermediate metallic layer with a thickness of about 60μ did remain uniformly, as shown in FIG. 4. Also, the titanium/titanium interface and the steel/steel interface both formed by explosive bonding after the first rolling underwent recrystallization and transformation at the time of the second hot rolling, and no traces of these interfaces were recognized.

EXAMPLE 14

Commercially pure niobium plate of commercial availability having 1.5 mm thickness, 500 mm width and 500 mm length and commercially available oxygen-free copper plate (JIS H 3100 C1020P) of 14 mm thickness, 500 mm width and 500 mm length were explosive bonded.

This two-layered clad plate was cold rolled into clad plate of (0.3+2.8) mm thickness, 500 mm width and 2,500 mm length.

From this two-layered clad plate was cut a clad plate of (0.3+2.8) mm thickness, 500 mm width and 1,000 mm length. The copper side of this clad plate was explosive bonded on commercially available JIS G SB42 steel plate of 150 mm thickness, 500 mm width and 1,000 mm length and three-layered clad plate was obtained. Further, on the niobium surface of this three-layered clad was explosive bonded commercially pure titanium plate of commercial availability having 10 mm thickness, 500 mm width and 1,000 mm length.

This four-layered clad steel plate was heated at 850° C. for 1 hr. and immediately rolled into titanium clad steel plate of 32.6 mm thickness, 1,000 mm width and 2,500 mm length.

Mechanical test results of the above titanium clad steel plate in as-rolled condition and after heat treatment of 850° C.×1 hr. followed by air cooling were as shown in Table 2. Test items were in accordance with JIS G 3603 for titanium clad steel plate.

The results showed that this titanium clad plate was excellent in bond strength, ductility and bending ability, and well satisfied the specification values.

Microscopic observation for the cross section of the above titanium clad steel revealed that the intermediate metallic layer and the supplemental intermediate layer did remain uniformly with thicknesses of about 60μ and about 560μ, respectively.

TABLE 2

Results of Mechanical Tests

| | Material combination | Heat treatment | Tension test | | | Bending test | | Shear strength (kgf/mm²) |
|---|---|---|---|---|---|---|---|---|
| | | | Tensile strength (kgf/mm²) | Yielding point (kgf/mm²) | Elongation (%) | Face bend R = 2T | Root bend R = T | |
| Specifications | — | — | At least[1] σ_B | — | Min. 21 | (2) | (2) | Min. 14 |
| Example 13 | Ti/Nb/SB | As rolled | 53.6 | 41.0 | 22.5 | Good | Good | 35.0, 31.8, 32.0 |
| Example 13 | Ti/Nb/SB | 850° C. × 1 hr., air cooling | 45.3 | 26.7 | 32.4 | Good | Good | 31.6, 31.0, 31.2 |
| Example 14 | Ti/Nb/Cu/SB | as rolled | 49.1 | 39.7 | 23.8 | Good | Good | 28.0, 28.7, 30.9 |
| Example 14 | Ti/Nb/Cu/SB | 850° C. × 1 hr., | 46.1 | 29.6 | 33.4 | Good | Good | 28.2, 27.9, 27.5 |

TABLE 2-continued

| | | Results of Mechanical Tests | | | | | |
|---|---|---|---|---|---|---|---|
| | | Tension test | | | Bending test | | Shear |
| Material combination | Heat treatment | Tensile strength (kgf/mm$^2$) | Yielding point (kgf/mm$^2$) | Elongation (%) | Face bend R = 2T | Root bend R = T | strength (kgf/mm$^2$) |
| | air cooling | | | | | | |

Note

[1]The lower limit of the specified value $\sigma_B$ (kgf/mm$^2$) for the tensile strength of clad steel shall be calculated from the following formula:

$$\sigma_B = \frac{t_1\sigma_1 + t_2\sigma_2}{t_1 + t_2} \text{ where}$$

$\sigma_1$ = lower limit of the specified value for the tensile strength of the base plate, kgf/mm$^2$,
$\sigma_2$ = lower limit of the specified value for the tensile strength of the cladding plate, kgf/mm$^2$,
$t_1$ = thickness of base plate, mm,
$t_2$ = thickness of the cladding plate, mm.

Note

[2]Radius (R) for the face bend shall comply with the standard for the cladding plate. For the root bend, the radius (R) shall comply with the standard for the base plate (the outside of the bent part shall be free from cracks). However, if the inside radius specified in the standard for the base plate is less than one time the overall thickness (T), it shall be as large as one time (the outside of the bent part shall be free from cracks).

What is claimed is:

1. A method for manufacturing a titanium clad steel plate, comprising explosive bonding a cladding metal plate consisting of pure titanium having a titanium content of at least about 99.4% by weight, a first intermediate plate of a metal selected from tantalum, a tantalum alloy, niobium and a niobium alloy and a second intermediate plate of a metal selected from copper, a copper alloy, nickel and a nickel alloy, and a base metal plate consisting of carbon steel so that the first intermediate plate is situated between the cladding metal plate and the second intermediate plate and the second intermediate plate is situated between the first intermediate plate and the base metal plate, and then hot rolling the explosive bonded titanium clad steel plate.

2. The method for manufacturing a titanium clad steel plate according to claim 1, further comprising explosive bonding the same material of an outer layer of the titanium clad steel plate on the surface of said outer layer, and then hot rolling the explosive bonded titanium clad steel plate.

3. A titanium clad steel plate produced by a method comprising explosive bonding a cladding metal plate consisting of pure titanium having a titanium content of at least about 99.4% by weight, a first intermediate plate of a metal selected from tantalum, a tantalum alloy, niobium and a niobium alloy and a second intermediate plate of a metal selected from copper, a copper alloy, nickel and a nickel alloy, and a base metal plate consisting of carbon steel so that the first intermediate plate is situated between the cladding metal plate and the second intermediate plate and the second intermediate plate is situated between the first intermediate plate and the base metal plate, and then hot rolling the explosive bonded titanium clad steel plate.

4. A titanium clad steel plate produced by a method comprising explosive bonding a cladding metal plate consisting of pure titanium having a titanium content of at least about 99.4% by weight, a first intermediate plate of a metal selected from tantalum, a tantalum alloy, niobium and a niobium alloy and a second intermediate plate of a metal selected from cooper, a copper alloy, nickel and a nickel alloy, and a base metal plate consisting of carbon steel so that the first intermediate plate is situated between the cladding metal plate and the second intermediate plate and the second intermediate plate is situated between the first intermediate plate and the base metal plate, hot rolling the explosive bonded titanium clad steel plate, explosive bonding the same material of an outer layer of the titanium clad steel plate on the surface of said outer layer, and then hot rolling the explosive bonded titanium clad steel plate.

5. The method for manufacturing a titanium clad steel plate according to any one of claims 1 and 2, wherein said explosive bonding of the metal plates to one another is carried out simultaneously.

6. The method for manufacturing a titanium clad steel plate according to any one of claims 1 and 2, wherein said explosive bonding of the metal plates to one another is carried out in successive steps.

7. The titanium clad steel plate of any one of claims 3 and 4, wherein said explosive bonding of the metal plates to one another is carried out simultaneously.

8. The titanium clad steel plate of any one of claims 3 and 4, wherein said explosive bonding of the metal plates to one another is carried out in successive steps.

* * * * *